US011341160B2

(12) United States Patent
Goren et al.

(10) Patent No.: US 11,341,160 B2
(45) Date of Patent: May 24, 2022

(54) SYSTEM AND METHOD FOR TIME SYNCHRONIZATION USING SNAP VALUES

(71) Applicant: Vast Data Ltd., Tel Aviv (IL)

(72) Inventors: Avi Goren, Tel Aviv (IL); Asaf Levy, Tel Aviv (IL); Yogev Vaknin, Karkur (IL)

(73) Assignee: Vast Data Ltd., Tel Aviv (IL)

( * ) Notice: Subject to any disclaimer, the term of this patent is extended or adjusted under 35 U.S.C. 154(b) by 265 days.

(21) Appl. No.: 16/592,286

(22) Filed: Oct. 3, 2019

(65) Prior Publication Data

US 2021/0103597 A1    Apr. 8, 2021

(51) Int. Cl.
 G06F 16/27    (2019.01)
(52) U.S. Cl.
 CPC ................... G06F 16/27 (2019.01)
(58) Field of Classification Search
 CPC .............................. G06F 16/27; H04Q 11/04
 USPC .......................................................... 707/626
 See application file for complete search history.

(56) References Cited

U.S. PATENT DOCUMENTS

| | | | |
|---|---|---|---|
| 2012/0102006 A1* | 4/2012 | Larson | G06F 16/275 707/703 |
| 2013/0103659 A1* | 4/2013 | Larson | G06F 16/27 707/703 |
| 2015/0254273 A1* | 9/2015 | Larson | G06F 16/951 707/703 |
| 2017/0149890 A1 | 5/2017 | Shamis et al. | |
| 2019/0294204 A1* | 9/2019 | Castro | G06F 1/12 |

* cited by examiner

Primary Examiner — Michael Pham
(74) Attorney, Agent, or Firm — M&B IP Analysts, LLC (57) ABSTRACT

A system and method for time synchronization. The method includes incrementing at least one instance of a snap value, wherein the at least one instance is stored in at least one storage node of a distributed storage system, wherein each of the at least one instance is incremented using a single-phase commit operation, wherein each of the plurality of storage nodes includes at least one timestamp, wherein each timestamp indicates a corresponding snap time, wherein each snap time is determined by reading one of the at least one instance at a time of creation of the corresponding timestamp.

22 Claims, 4 Drawing Sheets

SYSTEM AND METHOD FOR TIME SYNCHRONIZATION USING SNAP VALUES

TECHNICAL FIELD

The present disclosure relates generally to distributed storage systems, and more specifically to synchronizing times among nodes in distributed storage systems.

BACKGROUND

In distributed systems, there may be a need to ensure that times among nodes are synchronized. For example, in distributed storage systems, relative times of operations may be used to allow for recovery of data going back to a particular point in time relative to operations that were performed.

To this end, some techniques for synchronizing times have been developed. Existing solutions for synchronizing times among nodes require sending messages between nodes to establish a common time between the nodes. In particular, some existing solutions use a two-phase commit protocol. However, these solutions require suspending user operations (e.g., a read or write operation triggered by a user attempting to access data in the distributed storage system), thereby causing delay to the user.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for time synchronization. The method comprises: incrementing at least one instance of a snap value, wherein the at least one instance is stored in at least one storage node of a distributed storage system, wherein each of the at least one instance is incremented using a single-phase commit operation, wherein each of the plurality of storage nodes includes at least one timestamp, wherein each timestamp indicates a corresponding snap time, wherein each snap time is determined by reading one of the at least one instance at a time of creation of the corresponding timestamp.

Certain embodiments disclosed herein also include a non-transitory computer readable medium having stored thereon causing a processing circuitry to execute a process, the process comprising: incrementing at least one instance of a snap value, wherein the at least one instance is stored in at least one storage node of a distributed storage system, wherein each of the at least one instance is incremented using a single-phase commit operation, wherein each of the plurality of storage nodes includes at least one timestamp, wherein each timestamp indicates a corresponding snap time, wherein each snap time is determined by reading one of the at least one instance at a time of creation of the corresponding timestamp.

Certain embodiments disclosed herein also include a system for time synchronization. The system comprises: a processing circuitry; and a memory, the memory containing instructions that, when executed by the processing circuitry, configure the system to: increment at least one instance of a snap value, wherein the at least one instance is stored in at least one storage node of a distributed storage system, wherein each of the at least one instance is incremented using a single-phase commit operation, wherein each of the plurality of storage nodes includes at least one timestamp, wherein each timestamp indicates a corresponding snap time, wherein each snap time is determined by reading one of the at least one instance at a time of creation of the corresponding timestamp.

Certain embodiments disclosed herein also include a method for time synchronization. The method comprises: reading a first instance of a snap value to determine a first snap time when an input/output (I/O) operation is to be performed, wherein the I/O operation includes writing data, wherein at least one instance of the snap value is stored in at least one storage node of a distributed storage system, wherein the at least one instance includes the first instance, wherein each of the at least one instance of the snap value is incremented using a single-phase commit operation; and performing the I/O operation, wherein performing the I/O operation further comprises storing a first timestamp indicating the first snap time with the data written during the I/O operation.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for synchronizing times in distributed storage systems using snap time increments. In an embodiment, instances of a snap value are stored in storage nodes of a distributed storage system. The snap value is referenced for all input/output (I/O) operations performed on the distributed storage system. To this end, when an I/O operation would occur, the snap value is read (e.g., via remote direct memory access) in order to determine a current snap time. Data stored in the distributed storage system is timestamped, i.e., stored with a timestamp indicating the current snap time at the time of storage. The snap value is incremented (e.g., at periodic intervals) using an atomic write operation for each instance of the snap value stored in the storage nodes.

The disclosed embodiments also include various improvements to the above synchronization. To this end, in a further embodiment, a backup instance of the snap value is incremented before a visible instance of the snap value. In an example implementation, the backup instance is stored in non-volatile memory (e.g., non-volatile random access memory [NVRAM]) and the visible instance is stored in a volatile storage (e.g., RAM).

Additional improvements to the above synchronization include assigning an order to backup instances of the snap value to be used for incrementing and handling failures. To this end, in an embodiment, the backup instances of the snap value are assigned an order and the backup instances are incremented according to the assigned order. If one of the backup values is stored in a failed node such that it cannot be incremented when its turn in the incrementation order has arrived, that backup value is skipped and incrementation continues with the next backup instance in the order. In a further embodiment, the skipped backup instance is no longer used. When a visible instance of the snap value is stored in a node that has failed, handling the failure includes using the last backup instance in the order as the new visible value.

As a non-limiting example for ordering backup instances, backup instances (Bis) 1 through 4 and a visible instance are stored in respective locations in the storage nodes. The backup instances are assigned an order such that, when incrementing the snap value, the order is as follows: BI 1, BI 2, BI 3, BI 4, and the visible instance. As a further example, if BI 3 is stored in a failed node, then BI 3 is skipped during incrementation and incrementation continues with BI 4. If the node storing the visible instance has failed when the visible instance needs to be read, BI 4 may instead be used as the new visible instance to be read.

In another embodiment, reads of the snap value may be merged by generating a batch operation for multiple I/O operations that will require reading an instance of the snap value. This may, for example, ease loads placed on storage nodes or, more specifically, buffers used for storing visible instances of the snap value. To this end, it has been identified that only a single read operation can be active at a given time for the same node, but other operations that do not require reading the same data may be performed in parallel with a read operation. As a result, it has been identified that other operations may be performed while a batch read operation is active in order to reduce the impact on latency caused by using the snap value.

In yet another embodiment, instances of the snap value may be mirrored across multiple different storage nodes. For example, a visible instance may be mirrored and stored in different storage nodes. When the snap value needs to be read, one of the storage nodes containing a mirrored instance of the snap value is selected for reading. Different storage nodes are selected for different reads of the snap value instead of reading the snap value from the same storage node each time. When the snap value is incremented, the mirrored instances of the snap value are incremented sequentially in, for example, an arbitrary order. The selection may be, for example but not limited to, random. This allows for reducing hotspots caused by attempting to read the same storage node by different compute nodes.

The disclosed embodiments provide a synchronization mechanism that uses a single source of truth for all nodes. The single source of truth is updated using a single atomic operation (i.e., a single-phase operation) for each instance of the snap value rather than requiring a two-phase operation between nodes. Thus, the latency of the incrementation is equal to the latency of the slowest node involved in the incrementation rather than a combined latency of different nodes. This may be performed without suspending user operations such that the user does not experience any delay. The disclosed embodiments further allow for minimizing time increment overhead, I/O time assignment overhead, and the number of vulnerabilities that occur during time incrementation.

Figure 1:
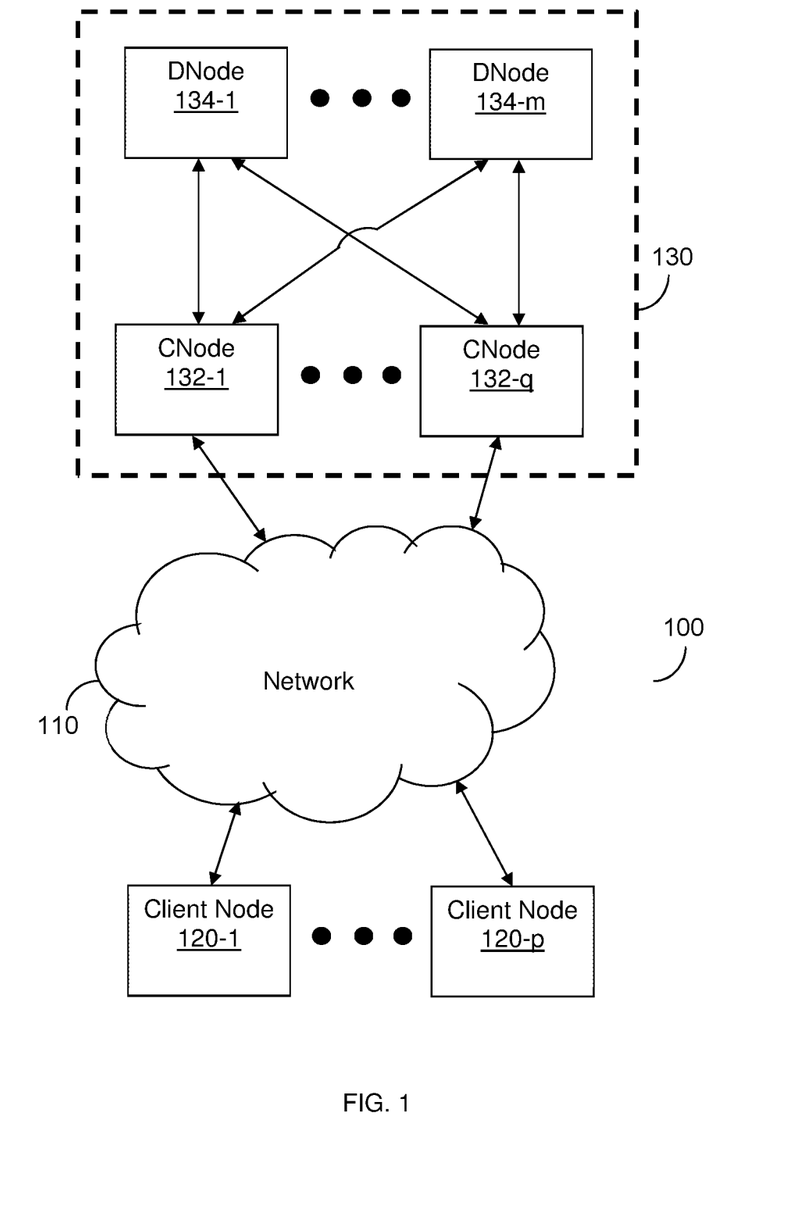
FIG. 1 is an example network diagram utilized to describe various disclosed embodiments.

FIG. 1 is a network diagram 100 illustrating an example distributed storage system utilized to describe various disclosed embodiments. The distributed storage system shown in FIG. 1 is an example distributed storage system to which the various disclosed embodiments could be applied.

The network diagram 100 includes a distributed storage system 130, a network 110, and client nodes 120-1 through 120-*p* (referred to as a client node 120 or as client nodes 120 for simplicity).

The distributed storage system 130 includes compute nodes (CNodes) 132-1 through 132-*q* (referred to as a CNode 132 or as CNodes 132 for simplicity) and storage nodes (DNodes) 134-1 through 134-*m* (referred to as a DNode 134 or as DNodes 134 for simplicity). In an example implementation, the distributed storage system 130 may be configured as described further in U.S. patent application Ser. No. 16/001,576, assigned to the common assignee, the contents of which are hereby incorporated by reference.

The network 110 may be, but is not limited to, a wireless, cellular or wired network, a local area network (LAN), a wide area network (WAN), a metro area network (MAN), the Internet, the worldwide web (WWW), similar networks, and any combination thereof. The client node 120 may be, but is not limited to, a server, a personal computer, a laptop, a tablet computer, a smartphone, or any other device configured to store data, access data, or both.

The DNodes 134 include at least non-volatile memories (e.g., Flash, 3D Xpoint) and volatile memories (e.g., RAM), and may be realized as combinations of volatile and non-volatile memories. The non-volatile memories may be included in, for example, hard-disk drives (HDDs), solid state drives (SSDs), or a combination thereof. In an example implementation, each DNode 134 includes one or more drives containing disks (not shown).

The CNodes 132 are configured to access data in the DNodes 134. In some implementations, the CNodes 132 may be configured to collectively act as a distributed transaction manager for accessing data in the DNodes 134. An example schematic diagram of a CNode 132 is described below with respect to FIG. 4.

The client node 120 is configured to send access commands to the distributed storage system 130 via the network 110. The CNodes 132 are configured to receive access commands from the client nodes 120 and to access the DNodes 134 based on the received commands. The access may include translating the received commands into a format supported by the DNodes 134. As a non-limiting example, NVM Express (NVMe) over Fabrics may be utilized to enable such access.

In an example implementation, each CNode 132 may access all DNodes 134. In a further example implementation, each CNode 132 is configured to read any data stored in any of the DNodes 134 and is configured to write data to one or more assigned portions of data stored in the DNodes 134.

In an embodiment, a CNode 132 is configured to perform input/output (I/O) operations on the DNodes 134 based on snap values and snap times as described herein. To this end, each CNode 132 may be assigned to one or more sets of data (e.g., stripes or rows) in the DNodes 134 and is configured to maintain a mapping of its respective sets of data to the location in the DNodes 134. The mapping and indication data may be stored in the respective CNode 132 or in the DNodes 134.

In an embodiment, each of the CNodes 132 is configured to initialize a snap value, increment a snap value, read snap values, or a combination thereof. Data is distributed across non-volatile memory (NVM) nodes and volatile memory nodes. Each NVM node is a unit of non-volatile memory and each volatile memory node is a unit of volatile memory. In an example implementation, each NVM node is a drive (not shown) in one of the DNodes 134.

In some implementations, one of the CNodes 132 may be selected as a leader node that is responsible for incrementing the snap value. In other implementations, different CNodes 132 may increment the snap value during different incrementations.

In an embodiment, a CNode 132 is configured to perform read operations with respect to snap values in the DNodes 134. In a further embodiment, the CNode 132 is configured perform batch operations and to perform other operations that do not require reading the snap value in parallel with the batch operation. Each batch operation includes successively performing reads of instances of the snap value.

It should be noted that the embodiments described herein are not limited to the arrangement shown in FIG. 1. For example, storage systems to which the disclosed techniques may be applied are not limited to the particular configuration of the distributed storage system 130. In particular, a storage system used for the techniques described herein may utilize a single compute node for managing the multiple storage nodes without departing from the scope of the disclosure.

Figure 2:
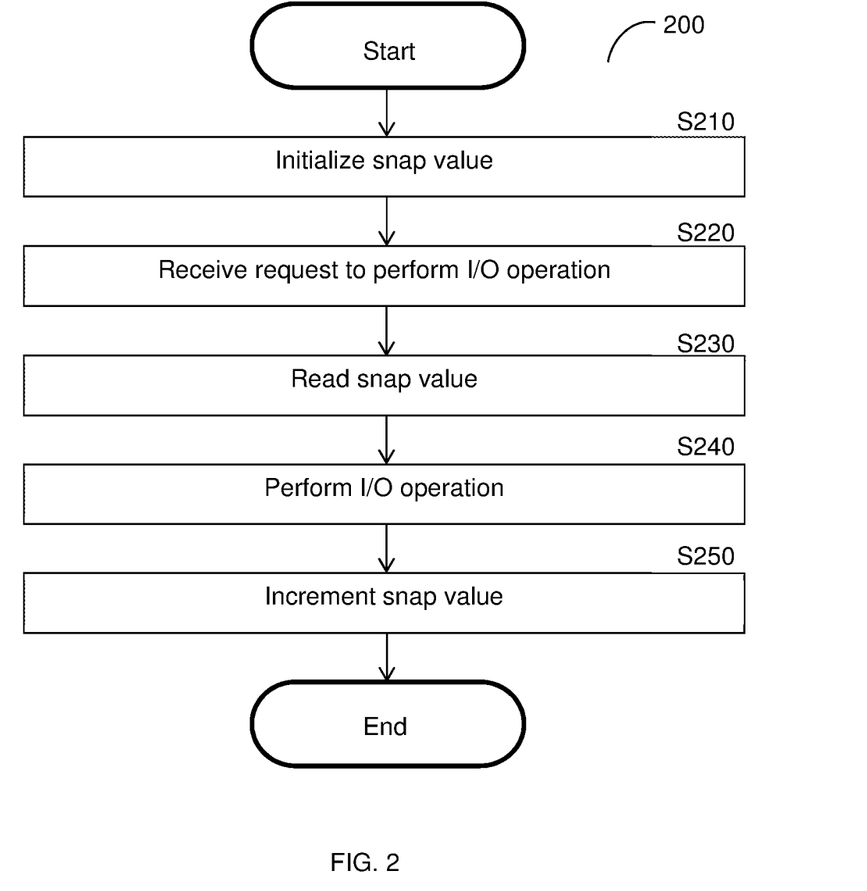
FIG. 2 is a flowchart illustrating a method for synchronizing times using snap values according to an embodiment.

FIG. 2 is a flowchart illustrating a method for synchronizing times using snap values according to an embodiment. In an embodiment, the method is performed by one of the CNodes 132, FIG. 1.

At S210, a snap value is initialized with an initial value. One or more instances of the snap are is stored in each of one or more storage nodes (e.g., the DNodes 134, FIG. 1). In a further embodiment, more than one instance of the snap value may be stored in each storage node. In yet a further embodiment, the instances of the snap value stored in each storage node include at least an instance stored in volatile memory (e.g., RAM) and an instance stored in non-volatile memory (e.g., NVRAM).

In an example implementation, the snap value is initialized to zero. The snap value may be incremented regularly (for example, periodically).

The snap value may be stored in multiple storage nodes in order to allow for reducing hotspots when snap values are accessed. The snap value may further be stored in both volatile and non-volatile memory (one as a visible instance that is normally used and one as a backup instance that is used as a backup when the visible instance is inaccessible) in each storage node in which the snap value is stored. Reducing hotspots through storage of snap values and storing backups of snap values are described further herein.

At S220, a request to perform an input/output (I/O) operation is received. In an example implementation, the request is for a write operation or other operation that requires storing data in one or more storage nodes.

At S230, the snap value is read to determine a current snap time. In an example implementation, an instance of the snap value is read from a volatile memory of a storage node using remote direct memory access (RDMA). In an embodiment, the storage node from which the snap value is to be read may be determined randomly. This allows for avoiding hotspots caused by excessive numbers of reads of the snap value from the same storage node around the same time. In a further embodiment, the storage node may be determined randomly and, if the randomly determined storage node is inaccessible or otherwise unsuitable to read from (e.g., if a transition bit is set for the storage node), a default storage node may be read from.

In an embodiment, S230 includes reading a visible instance of the snap value. The visible instance of the snap value may be, but is not limited to, stored in volatile memory.

At S240, the I/O operation is performed. In an embodiment, S240 includes adding a timestamp to data stored as part of the I/O operation. The timestamp indicates the current snap time determined at S230.

At S250, the snap value is incremented. In an embodiment, S250 includes incrementing each instance of the snap value in the storage nodes. The snap value may be incremented at, for example, periodic intervals. Accordingly, the snap values represent times with respect to these intervals. The incrementation of each instance of the snap value is a simple write operation (e.g., a single atomic operation) and is performed in a single phase for each instance of the snap value being incremented.

In another embodiment, the snap value may be incremented using instances of the snap value distributed across multiple storage nodes in order to avoid causing a hotspot due to excessive numbers of reads of the snap value at the same storage node around the same time. To this end, given "N" storage nodes each holding a snap value of "X" in a respective buffer (e.g., a remote direct memory access buffer), the process of incrementing the snap value to "X+1" may be as follows. The N storage nodes include a first storage node and one or more second storage nodes. Each of the N storage nodes includes a respective buffer. The buffers of the second storage nodes are set to hold X+1 with a transition bit set. Then, the buffer of the first storage node is set to hold X+1. Then, the buffers of the second storage nodes are set to hold X+1 with a transition bit unset.

In embodiments involving snap incrementation across multiple storage nodes, subsequent reads of instances of the snap value result in determining a snap time as well as a transition bit status if one of the second storage nodes was read. Thus, an instance of the snap value may be read from one of the second storage nodes. If the transition bit is unset, an instance of the snap value of the read second storage node is used. Otherwise (i.e., if the transition bit was set), the instance of the snap value of the first storage node is used.

In a further embodiment, snap incrementation across multiple storage nodes may be optimized based on the transition bit. In such an embodiment, if the result of reading from one of the second storage nodes is a snap time of X and an indication that the transition bit was set, the first storage node is used exclusively for reads until a snap time of X+1 is determined from reading the first storage node. This reduces redundant reads to the second storage nodes when such reads will ultimately be redirected back to the first node.

It should be noted that the steps of FIG. 2 are shown in a particular order merely for discussion purposes, but that the steps of FIG. 2 are not limited to this particular order. For example, the periodic incrementation of the snap value may occur at any time(s) during the steps of FIG. 2 after the initialization of the snap value at S210. For example, one or more incrementations may occur before step S220, additional incrementations may continue after S240, or both.

It should also be noted that different portions of the method of FIG. 2 may be performed by different compute nodes (e.g., different nodes among the CNodes 132). In particular, one compute node may be elected as a leader that is responsible for initializing the snap value, incrementing the snap value, or both. The snap value may be read and utilized by any of the compute nodes of a distributed system according to steps S220 through S240, regardless of whether the node using the snap value is the leader. Accordingly, the snap value provides a single source of truth for the time in the distributed storage system without requiring synchronizing among nodes.

It should also be noted that various embodiments are discussed with respect to distinct compute and storage nodes merely for simplicity purposes, and that the compute nodes may be integrated in the storage nodes or the storage nodes may otherwise be configured for performing functions of the compute nodes without departing from the scope of the disclosure.

Figure 3:
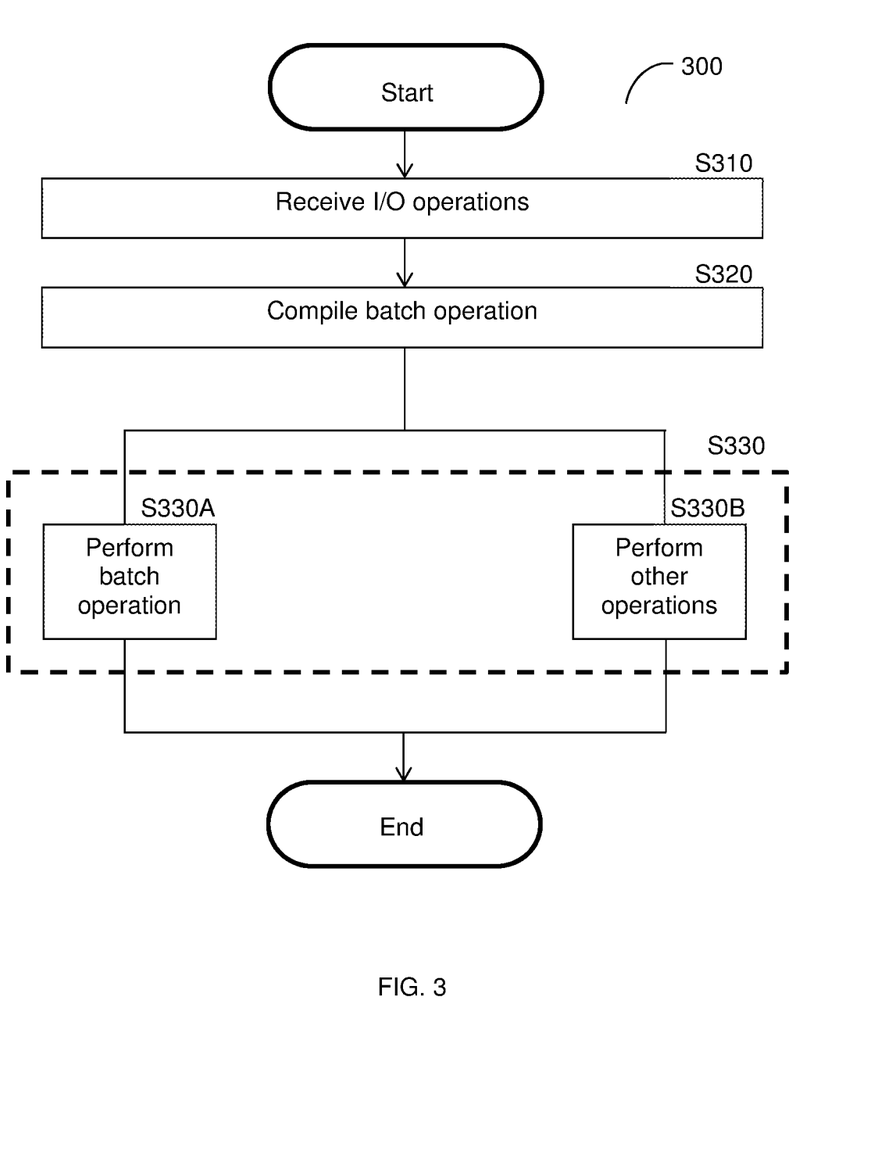
FIG. 3 is a flowchart illustrating a method for reducing hotspots in snap value incrementation according to an embodiment.

FIG. 3 is a flowchart illustrating a method for reducing hotspots in snap value incrementation according to an embodiment. In an embodiment, the method is performed by one of the CNodes 132, FIG. 1. The method may be performed in conjunction with the method of FIG. 2 in order to reduce hotspots related to multiple reads of the snap value in the same storage node at the same time.

At S310, multiple I/O operations that will require reads are received. The I/O operations may be mutating operations (e.g., write operations) that will result in modifying data and, therefore, a timestamp reflecting the current snap time will be required for each operation. In an embodiment, the I/O operations include write operations or other operations that will require reading a snap value (such as the I/O operation requested at S220, FIG. 2).

At S320, a batch operation is compiled for the received I/O operations. The batch operation includes reading an instance of the snap value for each received I/O operation.

At S330, the batch operation is performed (S330A) in parallel with one or more other operations (S330B). In an embodiment, the other operations may include any operations that do not require reading the same instance of the snap value as the batch operation. By allowing other operations while the batch operation is proceeding, the impact of processing the snap values on latency in the distributed storage system are minimized.

Figure 4:
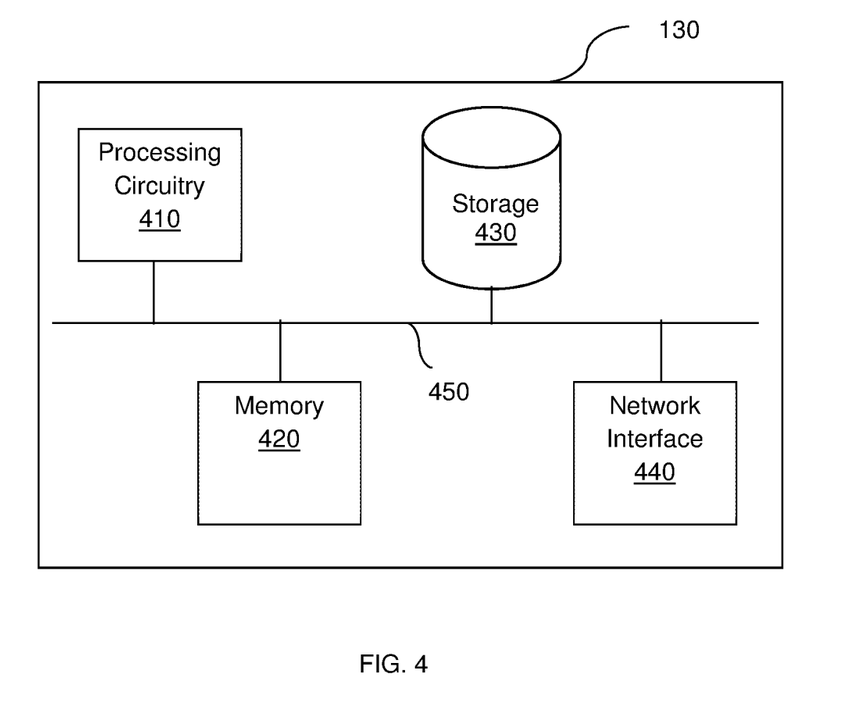
FIG. 4 is a schematic diagram of a compute node according to an embodiment.

FIG. 4 is an example schematic diagram of a compute node (CNode) 132 according to an embodiment. The CNode 132 includes a processing circuitry 410 coupled to a memory 420, a storage 430, and a network interface 440. In an embodiment, the components of the CNode 132 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, CD-ROM, Digital Versatile Disks (DVDs), or any other medium which can be used to store the desired information.

The network interface 440 allows the CNode 132 to communicate with the client nodes 120 for the purpose of receiving data to be stored, sending retrieved data, receiving I/O commands to be performed, and the like.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for time synchronization, comprising:
   incrementing, during each interval of multiple periodic time intervals, a set of instances of a snap value that represents a snap time of a distributed storage system, wherein the instances of the set are stored in a set of first storage nodes of the distributed storage system, wherein each instance is incremented using a single-phase commit operation, wherein the instances of the set of instances are assigned a certain order and incremented according to the certain order, wherein the set of first storage nodes is accessible to compute nodes of the distributed storage system; and
   writing data, by one of the compute nodes, to a second storage node of the distributed storage system, and associating the data with a timestamp, wherein the timestamp indicates a current snap time, wherein the current snap time is determined by reading a last updated instance of the set of instances, wherein the last updated instance is determined according to the certain order.

2. The method of claim 1, wherein each instance of the snap value is read using remote direct memory access.

3. The method of claim 1, wherein the set of instances of the snap value includes at least one first instance and a second instance, wherein incrementing the set of instances of the snap value further comprises:
   incrementing each first instance prior to incrementing the second instance; and
   determining the corresponding snap time by reading the second instance.

4. The method of claim 3, wherein storage nodes of the set of first storage nodes include a volatile memory and a non-volatile memory, wherein the at least one first instance is stored in the non-volatile memory of at least one third storage node of the set of first storage nodes, wherein the second instance is stored in the volatile memory of a fourth storage node of the set of first storage nodes.

5. The method of claim 3, wherein the at least one first instance includes multiple first instances that are assigned an order of first instances, wherein the multiple first instances are incremented according to the order of first instances.

6. The method of claim 1, further comprising:
   upon a failure of a storage node storing the last updated instance, selecting a new last updated instance among instances of the set of instances that are stored in non-failed storage nodes, wherein the selecting is based on the certain order.

7. The method of claim 1, further comprising:
   combining a plurality of read operations into a batch read operation, wherein each of the plurality of read operations is an attempt to read one instance of the set of snap values; and
   performing the batch read operation.

8. The method of claim 7, further comprising:
   performing at least one other operation while the batch read operation is being performed, wherein the at least one other operation does not require reading any of the instances of the set of instances of the snap value.

9. A non-transitory computer readable medium having stored thereon instructions for causing a processing circuitry to execute a process, the process comprising:
   incrementing, during each interval of multiple periodic time intervals, a set of instances of a snap value that represents a snap time of a distributed storage system, wherein the instances of the set of instances are stored in a set of first storage nodes of the distributed storage system, wherein each instance is incremented using a single-phase commit operation, wherein the instances of the set of instances are assigned a certain order and incremented according to the certain order, wherein the set of first storage nodes is accessible to compute nodes of the distributed storage system; and
   writing data, by one of the compute nodes, to a second storage node of the distributed storage system, and associating the data with a timestamp, wherein the timestamp indicates a current snap time, wherein the current snap time is determined by reading a last updated instance of the set of instances, wherein the last updated instance is determined according to the certain order.

10. A system for time synchronization, comprising:
    a processing circuitry; and
    a memory, the memory containing instructions that, when executed by the processing circuitry, configure the system to:
    increment, during each interval of multiple periodic time intervals, a set of instances of a snap value that represents a snap time of the system, wherein the instances of the set of instances are stored in a set of first storage nodes of the system, wherein each instance is incremented using a single-phase commit operation, wherein the instances of the set of instances are assigned a certain order and incremented according to the certain order, wherein the set of first storage nodes is accessible to compute nodes of the system; and
    write data, by one of the compute nodes, to a second storage node of the system, and associating the data with a timestamp, wherein the timestamp indicates a current snap time, wherein the current snap time is determined by reading a last updated instance of the set of instances, wherein the last updated instance is determined according to the certain order.

11. The system of claim 10, wherein each instance of the snap value is read using remote direct memory access.

12. The system of claim 10, wherein the set of instances of the snap value includes at least one first instance and a second instance, wherein the system is further configured to:

increment each first instance prior to incrementing the second instance; and determine the corresponding snap time by reading the second instance.

13. The system of claim 12, wherein storage nodes of the set of first storage nodes include a volatile memory and a non-volatile memory, wherein the at least one first instance is stored in the non-volatile memory of at least one third storage node of the set of first storage nodes, wherein the second instance is stored in the volatile memory of a fourth storage node of the set of first storage nodes.

14. The system of claim 12, wherein the at least one first instance includes multiple first instances that are assigned an order of first instances, wherein the multiple first instances are incremented according to the order of first instances.

15. The system of claim 10, wherein the system is further configured to:

upon a failure of a storage node storing the last updated instance, select a new last updated among instances of the set of instances that are stored in non-failed storage nodes, based on the certain order.

16. The system of claim 10, wherein the system is further configured to:

combine a plurality of read operations into a batch read operation, wherein each of the plurality of read operations is an attempt to read one instance of the set of snap values; and perform the batch read operation.

17. The system of claim 16, wherein the system is further configured to:

perform at least one other operation while the batch read operation is being performed, wherein the at least one other operation does not require reading any of the instances of the set of instances of the snap value.

18. A method for time synchronization, comprising:

reading, by a compute node of a distributed storage system, a first instance of a snap value to determine a first snap time when an input/output (I/O) operation is to be performed, wherein the I/O operation includes writing data, wherein the first instance is selected from a set of instances of the snap value stored in a set of storage nodes of the distributed storage system, wherein each of the instances of the snap value is incremented periodically; and performing the I/O operation, wherein performing the I/O operation further comprises storing a first timestamp indicating the first snap time with the data written during the I/O operation.

19. The method of claim 18, wherein the first instance is randomly selected from among instances of the set of instances.

20. The method of claim 18, wherein different instances of the set of snap values are read upon storing data of different I/O requests, by using remote direct memory access.

21. The method of claim 18, further comprising:

detecting that the first instance of the snap value is during a transition state for incrementing the first instance; and reading a second instance of the set of instances to determine the first snap time.

22. The method of claim 21, wherein the instances of the set of instances are incremented according to a certain order assigned to the instances, wherein the second instance is selected according to a reverse order of the certain order.

* * * * *